United States Patent [19]
Yared et al.

[11] Patent Number: 5,388,897
[45] Date of Patent: Feb. 14, 1995

[54] VACUUM BRAKE BOOSTER WITH TRACTION CONTROL

[75] Inventors: Linda S. Yared; Leo H. McCormick, Jr., both of South Bend, Ind.

[73] Assignee: AlliedSignal Inc., Morristown, N.J.

[21] Appl. No.: 231,609

[22] Filed: Apr. 22, 1994

Related U.S. Application Data

[63] Continuation of Ser. No. 110,452, Aug. 23, 1993, abandoned.

[51] Int. Cl.6 ............................. B60T 8/32; B60T 8/44
[52] U.S. Cl. ................................. 303/113.3; 188/356; 303/114.3
[58] Field of Search ............... 303/113.2, 113.3, 113.4, 303/114.3, 10; 180/197; 188/356, 357; 91/369.1, 369.3, 369.2; 60/545, 547.1

[56] References Cited

U.S. PATENT DOCUMENTS

| | | | |
|---|---|---|---|
| 4,630,706 | 12/1986 | Takayama et al. | 303/114.3 |
| 4,778,225 | 10/1988 | Rudolph et al. | 303/113.3 |
| 4,778,226 | 10/1988 | Brown | 303/10 |
| 4,819,996 | 4/1989 | Belart et al. | 303/114.3 |
| 5,096,267 | 3/1992 | Volz | 303/113.3 |
| 5,098,170 | 3/1992 | Watanabe | 188/356 |
| 5,176,433 | 1/1993 | Byrnes et al. | 303/113.3 |
| 5,312,173 | 5/1994 | Rossigno | 303/113.3 |

Primary Examiner—Douglas C. Butler
Attorney, Agent, or Firm—Leo H. McCormick, Jr.; Larry J. Palguta

[57] ABSTRACT

A vacuum brake booster (12) for use in a brake system (10) having a traction control function to selectively effect a brake application of driving wheels of a vehicle to synchronize the rotational spin thereof. The vacuum brake booster (12) has movable wall (62) which separates a housing (56) into a front chamber (58) and a rear chamber (60). The front chamber (58) is connected to the rear chamber (60) by a first passage (61), a bore (59) and a second passage (63) in the movable wall (62). A first control valve (66) located in the bore (59) controls communication of a first fluid through the first passage (61) to the bore (59) and a second fluid to create a first pressure differential in the brake booster (12) and produce a first operational output to effect a brake application in an operational mode of operation. The first operational output force is supplied to a master cylinder (14) from which pressurized fluid is supplied to the wheel brakes to effect a brake application for the vehicle. A second control valve (80) responsive to an operational signal from an electronic control unit (34) corresponding to rotational spin 1 of the drive wheels of a vehicle communicates a third fluid to a balloon (88) or piston (150) to initially interrupt communication of the first fluid through the first passage (61) and thereafter initiates communication of the second fluid to the second chamber (80) to create a second pressure differential to develop a second operational output force. The second operational output force is supplied to the master cylinder (14) from which pressurized fluid is selectively communicated to the driving wheels to effect a brake application which synchronizes the rotational spin of the driving wheels.

7 Claims, 2 Drawing Sheets

VACUUM BRAKE BOOSTER WITH TRACTION CONTROL

This application is a continuation of U.S. application Ser. No. 08/110,452 filed Aug. 23, 1993, now abandoned.

BACKGROUND OF THE INVENTION

This invention relates to a vacuum booster responsive to first and second control valves for operating a master cylinder to provide a brake system with pressurized fluid to effect a brake application. The first control valve responds to a manual input to effect a brake application of all wheel brakes of a vehicle while the second control valve responds to an electrical signal from a controller to selectively effect a brake application of only the drive wheels of the vehicle. When the second control valve receives an actuation signal, pressurized fluid is supplied to an expandable member within a movable wall within the brake booster to interrupt communication of a first fluid to a rear chamber and thereafter initiate communication of a second fluid to the rear chamber to create a pressure differential across the movable wall from which an output force produced. The output force is supplied to the master cylinder to develop pressurized fluid for the brake system. This pressurized fluid is selectively communicated to the drive wheels as a function of the controller to effect a brake application of the drive wheels and thereby synchronize the rotational spin thereof.

Traction control circuits such as disclosed in U.S. Pat. Nos. 4,778,225, 5,096,267 and 5,176,433 have been incorporated into anti-lock brake systems to provide a way of synchronizing the rotational spin of the drive wheels of a vehicle. Unfortunately, during the activation of such traction control systems, the brake pedal, which is directly connected to the movable wall of the vacuum brake booster correspondingly moves or in order to incorporate the traction control structure into the brake system, the vacuum brake booster must be modified through the addition of various internal and external conduits which can significantly increase the cost of a brake system.

Copending U.S. patent application No. 08/068,881 filed May 28, 1993 and now U.S. Pat. No. 5,312,173 discloses a brake booster derived from a standard production brake booster with an add on structure to incorporate traction control through a modification of the input member. The input member is designed to be responsive to either an input force applied through a operator pedal assembly or an input force produced by an in-line traction servomotor which responds to a signal generated in a CPU from sensor signals corresponding to a difference in the rotational spin of the drive wheels to effect a brake application of the wheels in a vehicle. While the in-line traction servomotor would function in an adequate manner, their is an increase number of the overall structural components that must be located between the firewall of a vehicle and the brake pedal.

SUMMARY OF THE INVENTION

In the present invention, a brake booster has a first mode of operation resulting from a manual input force applied to a first control valve and a second mode of operation resulting from an electronic signal generated in a CPU and derived from a sensed wheel rotational spin and applied to a second control valve to effect a brake application of the wheel brakes of a vehicle. The brake booster has a movable wall which is modified through the addition of an expandable member located in a first passage which connects a front chamber to a rear chamber through a bore. The first control valve is located in the bore and controls communication of a first fluid from the first chamber through the first passage to the bore and eventually the second chamber. The first valve is positioned such that the fluid pressure in the front and rear chambers is equalized in the absence of a manual input force being applied to the input member. During the first mode of operation when an operator desires to effect a brake application, an input force applied to the input member which initially moves the first control valve to interrupt communication of the first fluid through the first passage and on further movement initiates communication of a second fluid present in the bore through a second passage in the movable wall to the second chamber. With the first fluid in the front chamber and the second fluid in the second chamber, a pressure differential is created across the movable wall to develop a first output force. The first output force is presented to a master cylinder to pressurize fluid which is supplied to all of the wheel brakes to effect a brake application. During the first mode of operation, the expandable member does not effect communication through the first passages since it is in a deflated state as a result of vacuum being communicated thereto as a function of the second control valve. On termination of the manual input force, a return spring valve moves the first control valve to allow vacuum to equalize the fluid pressure in the first and second chambers. When the controller or ECU receives inputs from the wheel sensors indicating a difference in the rotational spin of the drive wheels, an electronic signal is developed and supplied to the second control valve. Actuation of the second control valve initially terminates communication of vacuum to the expandable member and thereafter communicates fluid pressure to expand the expandable member and interrupt communication of the first fluid through the first passage. Thereafter, the second control valve supplies a second fluid to the second chamber. With vacuum in the first chamber and the second fluid in the second chamber a pressure differential is created which develops a second output force. This second output force operates the master cylinder to pressurize fluid which is selectively supplied to the drive wheels of the vehicle as a function of the controller to synchronize the rotational spin of the drive wheels.

The invention as disclosed herein offers an advantage over known brake system since traction control can be added to the system by a second control valve system which independently operates a vacuum brake booster by interrupting communication of a first fluid through a passage in a movable wall which connects a front chamber with a rear chamber and thereafter operating the brake booster through remote solenoid valves responsive to an electronic signal from a CPU in the brake system.

It is an object of this invention to provide a vacuum brake booster with an input member through which a control valve can be activated through either a first control valve responsive to a manual input from an operator or a second control valve responsive to an electronic input from a controller to effect a brake application of wheels of a vehicle.

BRIEF DESCRIPTION OF THE DRAWINGS

These advantages and objects should be apparent from reading the specification while viewing the drawings wherein:

FIG. 1(a) is a view of an adapter of the pedal assembly of FIG. 1;

DETAILED DESCRIPTION OF THE INVENTION

Figure 1:
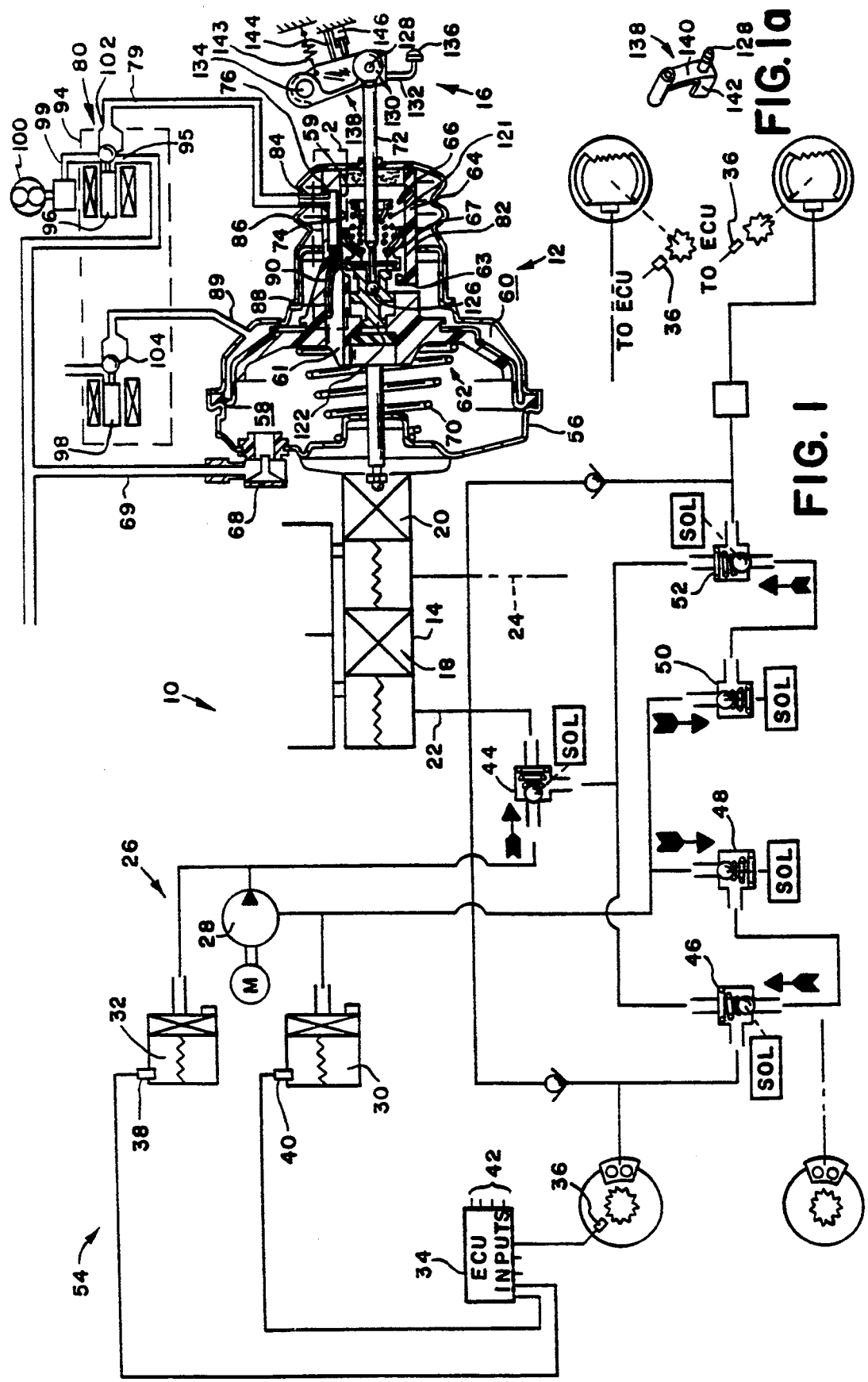
FIG. 1 is a schematic illustration of a brake system having a traction control system with a control valve for independently activating a vacuum brake booster according to the present invention.

The brake system 10 shown in FIG. 1 includes a vacuum brake booster 12 which is connected to a master cylinder assembly 14. The master cylinder 14 is connected to the wheels of a vehicle to effect a brake application in response to an operator input force supplied through pedal assembly 16. The master cylinder 14 is of a type disclosed in U.S. Pat. No. 4,474,005 wherein pressurized fluid created through movement of pistons 18 and 20 is supplied through primary and secondary circuits 22, 24 to the appropriate wheels of the vehicle. In addition, the master cylinder 14 is connected to a pump back type anti-lock brake system 54, of the type disclosed in U.S. Pat. No. 4,778,226. The anti-lock brake system 54 includes an control assembly 26 with a motor driven pump 28, sump 30, accumulator 32 and an electronic control unit (ECU) 34. The electronic control unit (ECU) 34 continually receives input signals from wheel speed sensors 36 which sense rotational spin of the individual wheel and various pressure and position switches 38, 40 associated with the sump 30 and accumulator 32. Based on information derived from these input signals, ECU 34 generates output signals at terminals 42 to control a plurality of solenoid actuated valves 44, 46, 48, 50 and 52. For simplicity only the valves for circuit 22 are illustrated in FIG. 1 but a similar number would be required for circuit 24. During a brake application, the signals from ECU 34 control the operation of the valves in brake circuits 22 and 24 to prevent skid of the wheels of the vehicle.

The vacuum brake booster 12 which is of a type as disclosed in U.S. Pat. No. 4,953,446 has a housing 56 which is separated into a front chamber 58 and a rear chamber 60 by a movable wall 62. The movable wall 62 has rearward cylindrical projection 64 which extends through an opening 82 in the housing 56. Projection 64 has a bore 59 therein for retaining a first control valve 66. Chamber 58 is connected by conduit 69 through check valve 68 to a source of vacuum, normally the intake manifold of an internal combustion engine in the vehicle. Bore 59 in movable wall 62 is connected by a first internal passage 61 to chamber 58 and by a second internal passage 63 to chamber 60. Depending on the position of the first control valve 66 located in bore 59, chambers 58 and 60 are connected to each other or isolated from each other. When the internal combustion engine is operating, vacuum normally evacuates air from chambers 58 and 60 by way of the first internal passage 61, bore 59 and the second internal passage 63 to allow return spring 70 to position movable wall 62 in a rest position as shown in FIG. 1. In the first mode of operation of the vacuum brake booster 12 the first control valve 66 is responsive to a manual input applied to pedal assembly 16 connected to push rod 72.

Figure 2:
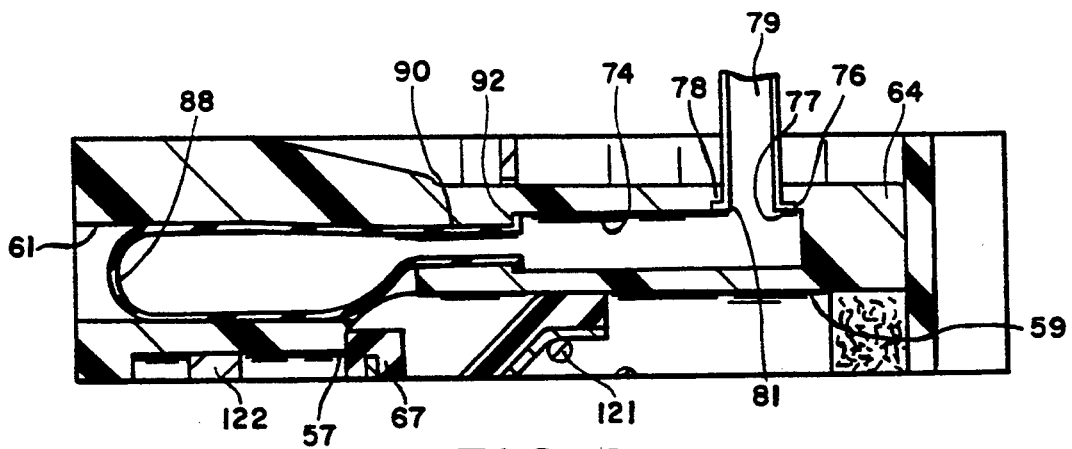
FIG. 2 is an enlarged view of sectional view of the circumscribed area of FIG. 1 with a balloon in an expanded condition to seal a first passage in the movable wall which connects the front chamber with a bore and the rear chamber.

The projection 64 of movable wall 62, as best shown in FIG. 2, includes a third passage 74 which extends from a radial opening 76 to the first passage 61. Radial opening 76 has a lip 78 for receiving flange 77 on the end 81 of flexible conduit 79 connected to the second control valve 80. End 81 extends through boot 84 which surrounds opening 82 to prevent any contamination in the surrounding environment from effecting the seal between the housing 56 and cylindrical projection 64 which could cause wear therebetween. Boot 84 has a flexible section 86 which allows unrestricted movement of end 81 when movable wall 62 moves during a brake application. A balloon or bellows 88 located in the first passage 61 has a stem 90 which snaps into groove 92 in the cylindrical projection 64 to seal and isolate the third passage 74 from bore 59.

The second control valve 80 has a housing 94 which retains first and second solenoids 96 and 98. The first and second solenoids 96 and 98 are connected to receive operational input signals from terminal 42 of the ECU 34. Housing 94 has a first port 95 connected to receive vacuum present in the conduit 69, a second port 97 connected by conduit 99 to a source of pressurized fluid such as pump and accumulator assembly 100, a third port 102 connected by flexible conduit 79 to the third passage 74 in the cylindrical projection 64 and a fourth port 104 connected to the surrounding environment. In some applications, individual housings may be necessary for the first and second solenoids 96 and 98 but functionally for this invention they are illustrated as being retained in a single housing 94.

The pedal assembly 16 includes arm 132 with an end attached to pivot pin 134 and pad 136 through which an operator input is applied to push rod 72. Adapter 138, as best shown in FIG. 1(a), is located on pivot pin 134 and has a rectangular member 140 which carries pin 128 that is substantially parallel to arm 132. A flange 142 which extends at substantially a right angle from rectangular member 140 is designed to engage and communicate any input force applied to pad 136 to push rod 72 by way of arm 132, pin 128 and eye 130. A pedal return spring 143 acts on and positions arm 132 against pedal stop 144 and stop light switch 146 when no force is applied to pad 136.

MODE OF OPERATION OF THE INVENTION

Under normal operating conditions of the vehicle, vacuum created at the intake manifold of the engine evacuates air from the front chamber 58 and rear chamber 60 by way of check valve 68 and a flow path created by the first passage 61, bore 59 and second passage 63 in the movable wall 62. With the fluid pressure in chambers 58 and 60 substantially equal, return spring 70 positions movable wall 62 in the rest position shown in FIG. 1. At the same time, the second control valve 80 receives vacuum produced at the intake manifold through conduit 69 and in the absence of an electronic input signal from terminal 42 of ECU 34, the second control valve 80 allows vacuum to be freely communicated by flexible conduit 79 to the third passage 74 in projection 64 of the movable wall 62. With vacuum in the third passage 74, air is evacuated from the balloon or bellows 88 to assure that communication between the first passage 61 and bore 59 is not restricted.

In response to an operator applied input to pad 136, arm 132 pivots around pin 134 and supplies push rod 72 with an input force by way of flange 142 in adapter 138 and pin 128. Spherical head 126 on push rod 72 provides piston 122 of the first control valve with a manual and linear input which moves the piston 122 to operate the first control valve 66. Initial movement of piston 122 of the first control valve 66 from the rest portions allows a poppet valve 67 to seat on face 57 and terminate vacuum communication between passage 61 and bore 59 while further movement of piston allows air to be communicated through bore 59 to chamber 60 from the surrounding environment by way of the second passage 63. With air in chamber 60 and vacuum present in chamber 58, an operation pressure differential is created across movable wall 62 to produce an output force. The output force is supplied to master cylinder 14 to pressurize fluid therein and effect a brake application in a manner as described in U.S. Pat. No. 4,953,446.

During this first mode of operation wherein the vacuum brake booster 12 is operated in response to an operator input force applied to the pedal assembly 16, the second control valve 80 is inoperative and end 81 moves in the flexible section 86 of boot 84 in order for all of the manual input to be supplied to control valve 66.

During a brake application sensors 36 are continually supplying ECU 34 with information relating to the brake application. Should ECU 34 determine from such information that a lock up or skid may occur during such brake application, an anti-lock feature is activated in the brake system 10 in accordance with the teachings disclosed in U.S. Pat. No. 4,953,446.

On termination of the manual input to pedal 136, return spring 121 moves piston 122 of control valve 66 to terminate the communication of air to the second chamber 60 and initiate communication between chamber 58 and chamber 60 by way of the first passage 61, bore 59 and the second passage 63. As the fluid pressure in chambers 58 and 60 equalizes, return spring 70 repositions the movable wall 62 in the rest position shown in FIG. 1.

During the operation of a vehicle, sensors 36 continually provide ECU 34 with signals corresponding to the rotation of the wheels of the vehicle. In the event ECU 34 detects an undesirable difference in the rotational spin of the driving wheels of vehicle, appropriate control signals are outputted by terminals 42 to activate solenoids 96 and 98 of the second control valve 80 to initiate the second mode of operation of the vacuum brake booster 12. A signal from terminal 42 of ECU 34 is first applied to solenoid 96 to terminate communication of vacuum to balloon or bellows 88 and thereafter connect supply high pressure fluid from source 100 to expand the balloon or bellows 88 and seal the first passage 61 to terminate communication of vacuum from chamber 58 to bore 59 as shown in FIG. 2. When the balloon or bellows 88 is expanded or immediately after the high pressure fluid is communicated to the balloon or bellows 88, a signal from terminal 42 of ECU 34 is supplied to the second solenoid 98 to allow a second fluid (either atmospheric pressure air or high pressure air from source 100) to be communicated through conduit 89 to the second chamber 60. With vacuum in chamber 58 and the second fluid in chamber 60, a traction control pressure differential is created across movable wall 62. The traction control pressure differential acts on and moves movable wall 62 to create an output force which is supplied to master cylinder 14 which pressurizes fluid therein. ECU 34 selectively controls the communication of this pressurized fluid from the master cylinder 14 to the individual driving wheels to selectively effect braking thereof. The selective brake application of a drive wheel absorbs a portion of an operational torque applied to that drive wheel such that synchronization occurs in its rotational spin with another drive wheel. It should be noted that during the operation of brake booster 12 through the activation of the second control valve 80, arm 132 is held in a stationary position by the spring 143 since adapter 138 can independently pivot on pin 134. On termination of the input signals from terminal 42 of the ECU 34, plungers in the first and second solenoids 96 and 98 of the second control valve 80 are repositioned by springs such that communication of the second fluid to the second chamber 60 is terminated and vacuum is made available to evacuated air from balloon or bellows 88 to thereafter permit unrestricted communication between the front chamber 58 and bore 59 through the first passage 61.

SECONDARY EMBODIMENT OF THE INVENTION

For some applications, it may be possible to inflate the balloon or bellows 88 by a pressure differential created between vacuum and atmospheric pressure and as a result the pump and accumulator assembly 100 or other source of pressurized fluid may not be needed. However, it is felt that a pressure greater than atmospheric pressure is needed in order to insure that a seal occurs within a time period corresponding to the difference in the time period that input signals are supplied by the ECU 34 to activate the first solenoid 96 and second solenoid 98 of the second control valve 80.

Figure 5:
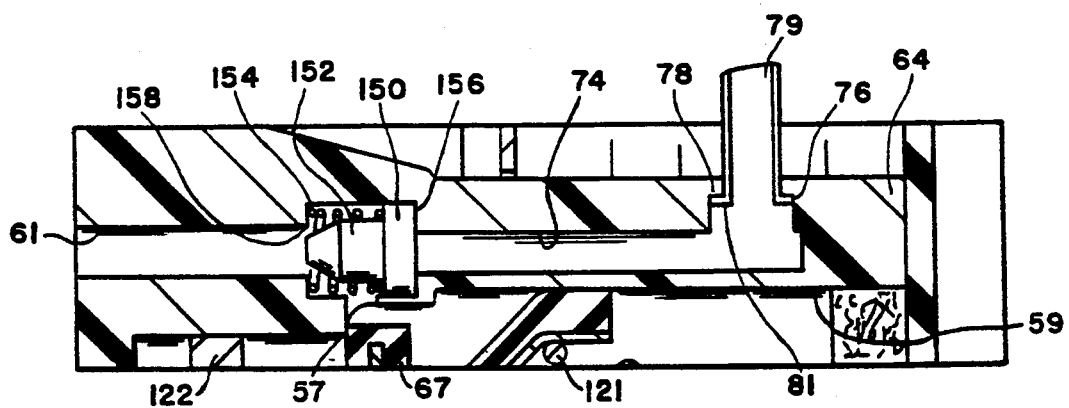
FIG. 5 is a sectional view of a portion of the projection that extends from the movable wall of the brake booster of FIG. 1 with a piston arrangement for controlling communication through the first passage 1.
Figure 3:
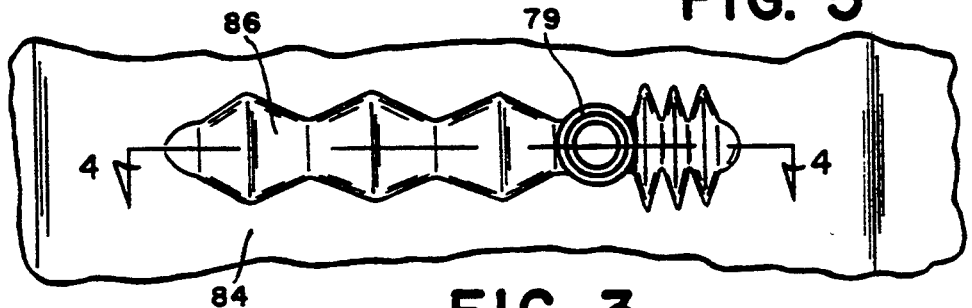
FIG. 3 is a sectional view of a portion of the boot which surrounds the cylindrical projection of the movable wall of the vacuum brake booster of FIG. 1.
Figure 4:
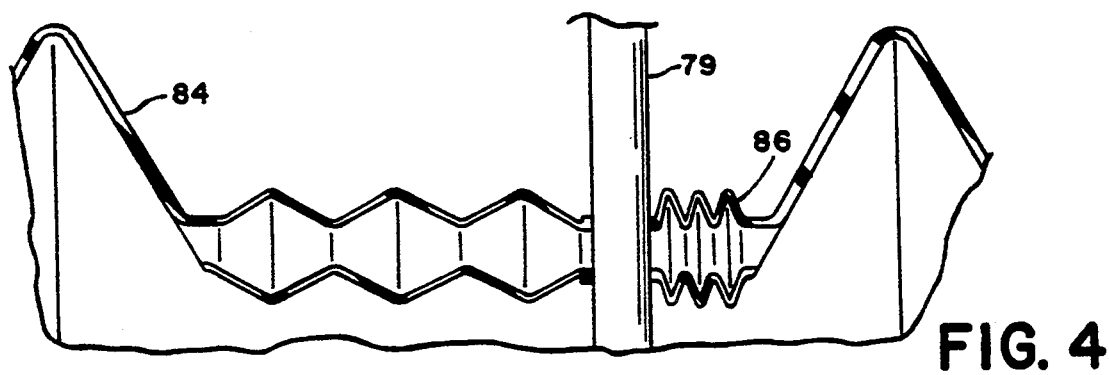
FIG. 4 is a sectional view taken along line 4—4 of FIG. 3.

FIG. 5 illustrates an the embodiment of the brake booster of FIG. 1, wherein the bellows or balloon 88 has been replaced with a piston assembly 150. The piston assembly 150 includes a cylindrical body 152 located in the third passage 74 and a return spring 154. Return spring 154 urges the cylindrical body 152 against a stop 156 in the third passage 74 to assure that communication of vacuum through the first passage 61 is unrestricted in the absence of an operational input signals being supplied to the first solenoid 96 and second solenoid 98 of the second control valve 80. When the second control valve 80 receives an operational signals from terminal 42 of the ECU 34, the first solenoid 96 is first activated and moves to communicate high pressure fluid to the third passage 74 in the cylindrical projection 64. This high pressure fluid acts on and moves cylindrical body 152 against a seat 158 and interrupts communication through the first passage 61. Thereafter, the second solenoid 98 is activated and moves to allow the second fluid to be communicated to the second chamber 60 to create a pressure differential corresponding to the input signals from the ECU 34. This pressure differential acts on the movable wall 62 to pressurize fluid in the master cylinder 14 which is thereafter selectively supplied to the drive wheel brakes as a function of the ECU 34 to synchronize the rotational spin of the driving wheels.

We claim:

1. A vacuum brake booster for use in a brake system of a vehicle to provide an output force for operating a pressurizing member to develop pressurized fluid to effect a brake application of at least first and second drive wheels of the vehicle, said brake booster having a housing with a movable wall which separates an interior of the housing into a first chamber and a second chamber, said movable wall having a bore therein with a first passage connected to the first chamber and a second passage connected to the second chamber, said vacuum booster having a first control valve located in said bore, said first control valve selectively controlling communication of a first fluid having a first fluid pressure between said first and second chambers to allow equalization of the first fluid pressure there between and responsive to an operator input for initially interrupting communication of said first fluid through said first passage and later initiating communication of a second fluid having a second fluid pressure through said second passage to said second chamber to create a first pressure differential across the movable wall and develop a first operational output force for operating said pressurizing member to effect a brake application of said drive wheels said brake booster being connected to a second control valve, said second control valve responsive to an operational signal from a control unit generated by a differential in the rotational spin of the first and second drive wheels for independently creating a second pressure differential across said movable wall between said first fluid and said second pressure to develop a second operational force for operating said fluid pressurizing member, said control unit controlling the communication of pressurized fluid derived from said second operational force to selectively effect a brake application of a drive wheel and synchronize the rotational spin thereof with another corresponding drive wheel, the brake booster being characterized by a cylindrical projection that extends from the movable wall through the housing, said cylindrical projection having a third passage therein and balloon means connected to said third passage and responsive to a third fluid having a third fluid pressure communicated to said third passage by said second control valve by expanding to seal said first passage and interrupt communication of said first fluid through said first passage to allow said second control valve to communicate said second fluid to said second chamber to by said second create said second pressure differential.

2. The brake booster as recited in claim 1 wherein said second control valve connects said balloon means to said first fluid on termination of said control signal to deflate said balloon means and thereafter allow uninterrupted communication of said first fluid through said first passage.

3. The brake booster as recited in claim 1 wherein said second control valve is characterized by having a first position where said first fluid is communicated to said balloon means, a second position where said third fluid is communicated to said balloon means and a third position where said second fluid is communicated to said second chamber to develop said second operational output force.

4. The brake booster as recited in claim 3 wherein said brake booster is further characterized by a flexible protection member that surrounds said cylindrical projection, said flexible protection member having an expandable section which allows a connection for the second control valve to move with said movable wall without effecting the development of pressurized fluid.

5. A vacuum brake booster for use in a brake system of a vehicle to provide an output force for operating a pressurizing member to develop pressurized fluid to effect a brake application of at least first and second drive wheels of the vehicle, said brake booster having a housing with a movable wall which separates an interior of the housing into a first chamber and a second chamber, said movable wall having a bore therein with a first passage connected to the first chamber and a second passage connected to the second chamber, said vacuum booster having a first control valve located in said bore, said first control valve selectively controlling communication of a first fluid having a first fluid pressure between said first and second chambers to allow equalization of the first fluid pressure there between and responsive to an operator input for initially interrupting communication of said first fluid through said first passage and later initiating communication of a second fluid having a second fluid pressure through said second passage to said second chamber to create a first pressure differential across the movable wall and develop a first operational output force for operating said pressurizing member to effect a brake application of said drive wheel, said brake booster being connected to a second control valve, said second control valve responsive to an operational signal from a control unit generated by a differential in the rotational spin of the first and second drive wheels for independently creating a second pressure differential across said movable wall between said first fluid and said second pressure to develop a second operational force for operating said fluid pressurizing member, said control unit controlling the communication of pressurized fluid derived from said second operational force to selectively effect a brake application of a drive wheel and synchronize the rotational spin thereof with another corresponding drive wheel, the brake booster being characterized by a cylindrical projection that extends from the movable wall through the housing, said cylindrical projection having a third passage therein and a piston arrangement between said first passage and said third passage, said piston arrangement being responsive to a third fluid having a third fluid pressure communicated to said third passage by said second control valve by moving to seal said first passage and interrupt communication of said first fluid through said first passage to allow said second control valve to communicate said second fluid to said second chamber to by said second create said second pressure differential.

6. The brake booster as recited in claim 5 wherein said brake booster is further characterized by a resilient member for moving said piston arrangement against a stop to assure free communication of said first fluid through said first passage when said first fluid is presented to said third passage.

7. The brake booster as recited in claim 5 wherein said second control valve is characterized by having a first position where said first fluid is communicated to said piston arrangement, a second position where said third fluid is communicated to said piston arrangement and a third position where said second fluid is communicated to said second chamber to develop said second operational output force.

* * * * *